United States Patent
Ito et al.

[11] Patent Number: 5,868,977
[45] Date of Patent: Feb. 9, 1999

[54] METHOD OF FIRING CERAMIC FOMRED BODY

[75] Inventors: Yasuhiro Ito; Yasushi Okumura, both of Nagoya; Kenji Kawaguchi, Komaki, all of Japan

[73] Assignee: NGK Insulators, Ltd., Japan

[21] Appl. No.: 45,593

[22] Filed: Mar. 23, 1998

[30] Foreign Application Priority Data

Mar. 28, 1997 [JP] Japan ................................. 9-077115

[51] Int. Cl.⁶ .................................................. C04B 33/32
[52] U.S. Cl. ...................... 264/40.1; 264/630; 264/656; 264/657; 264/677
[58] Field of Search ................................ 264/40.1, 656, 264/657, 677, 630

[56] References Cited

U.S. PATENT DOCUMENTS

| | | | |
|---|---|---|---|
| 4,795,598 | 1/1989 | Billiet | 264/344 |
| 5,078,829 | 1/1992 | Matsumae et al. | 264/40.1 |
| 5,271,877 | 12/1993 | Matsumae et al. | 264/40.1 |
| 5,419,859 | 5/1995 | Van den Sype | 264/40.1 |
| 5,725,829 | 3/1998 | Miyahara et al. | 264/656 |

FOREIGN PATENT DOCUMENTS 8-73274 0   3/1996   Japan .

*Primary Examiner*—James Derrington
*Attorney, Agent, or Firm*—Parkhurst & Wendel, LLP

[57] ABSTRACT

A method of firing a ceramic formed body, in which the ceramic formed body is fired by controlling a firing output state in such a manner that a high output state and a low output state are repeated reciprocally, is disclosed. In the method of firing a ceramic formed body, the improvement controls an opening angle of a burner defining the high output state, while a pulse output defining a reciprocal interval between the high output state and the low output state is maintained at constant.

5 Claims, 4 Drawing Sheets

METHOD OF FIRING CERAMIC FOMRED BODY

FIELD OF THE INVENTION

The present invention relates to a method of firing a ceramic formed body, in which the ceramic formed body is fired by controlling a firing output in such a manner that a high output state and a low output state are repeated reciprocally.

RELATED ART STATEMENT

Generally, a method of firing a ceramic formed body, in which the ceramic formed body is fired by controlling a firing output in such a manner that a high output state and a low output state are repeated reciprocally, is known in for example Japanese Patent Laid-Open Publication No. 8-73274 (JP-A-8-73274). The method of this kind is so-called as a pulse firing method. In the known so-called pulse firing method, advantages mentioned below are obtained as compared with a proportional firing method in which a firing output of the burner is controlled continuously and linearly in a firing furnace.

(1) Achievement of a low temperature ascending rate in a low temperature region by using a little amount of a diffusion air;

In the case of the pulse firing method, if an actual temperature in the firing furnace is increased over a predetermined temperature, a firing control can be performed by increasing a rest time interval defined by a low output state preferably a zero output. Therefore, it is possible to achieve a slow temperature ascending rate in a low temperature region even by a little amount of a diffusion air. Moreover, as compared with the proportional firing method, no extra fuel is necessary.

(2) Low fuel consuming amount of an after-burner;

As mentioned above in section (1), since a diffusion air consuming amount in the pulse firing method is low as compared with the proportional firing method, it is possible to decrease a fuel consuming amount of the after-burner. Since a gas generated by decomposing binders in forming agents during a firing step has an odor component, the so-called after-burner is used for completely firing such an odor component to remove the odor from the gas, and then the gas, from which the odor is removed, is discharged into the atmosphere.

As mentioned above, if the pulse firing method is applied for a firing of the ceramic formed body, it is possible to achieve an improvement of temperature controlling property, an improvement of temperature distribution and a reduction of fuel consuming amount. However, recently we find that a crack is liable to be generated in a fired body, if the ceramic formed body especially ceramic honeycomb structural formed body is fired by using the pulse firing method. We investigate a reason of crack generation, and find that the reason of crack generation is as follows.

Generally, the ceramic formed body to be fired includes a large amount of binder as a forming agent. During firing, the binder is decomposed by heat in a relatively low temperature region into a gas i.e. so-called binder fume. In the pulse firing method, since a gas amount supplied into the firing furnace is little as mentioned above, it is not possible to discharge such a binder fume completely to a gas duct. Therefore, a binder fume remained in the firing furnace is combusted therein, and thus an abrupt temperature increase generates around the ceramic formed body during firing, so that a crack is generated in the firing body.

SUMMARY OF THE INVENTION

An object of the invention is to eliminate the drawbacks mentioned above and to provide a method of firing a ceramic formed body in which a temperature distribution in a firing furnace is uniform as compared with the known pulse firing method and no crack is generated in a fired body.

According to the invention, the known pulse firing method is improved in the opening angle of the burner is controlled under a condition such that the pulse output is maintained at constant. Therefore, a concentration of binder fume can be controlled in such a manner that it is not beyond a lower limit of explosion at which a binder fume is abruptly combusted. In addition, in the present invention, no binder fume remains in the firing furnace in a highly condensed concentration since an atmosphere in the firing furnace is agitated at a high speed and at a high frequency.

DESCRIPTION OF THE PREFERRED EMBODIMENTS

Figure 1:
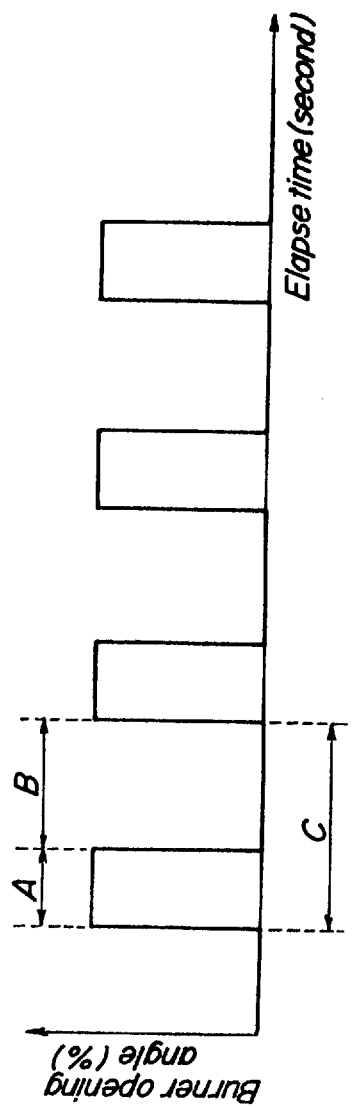
FIG. 1 is a graph showing a relation between an elapse time and a burner opening angle in a pulse firing method.

At first, a concept of normal pulse firing method and basic terms used in the pulse firing method will be explained. FIG. 1 is a graph showing a relation between an elapse time and a burner opening angle in the pulse firing method. In the embodiment shown in FIG. 1, respective times are defined as follows.

A: On time (high output state)

B: Rest time (low output state)

C(=A+B): Frequency

Pulse output (%)=(A/C)×100

In this case, if a value of the pulse output is larger, a frequency of firing becomes higher, and also a heat amount supplied into a firing furnace becomes larger.

Figure 2:
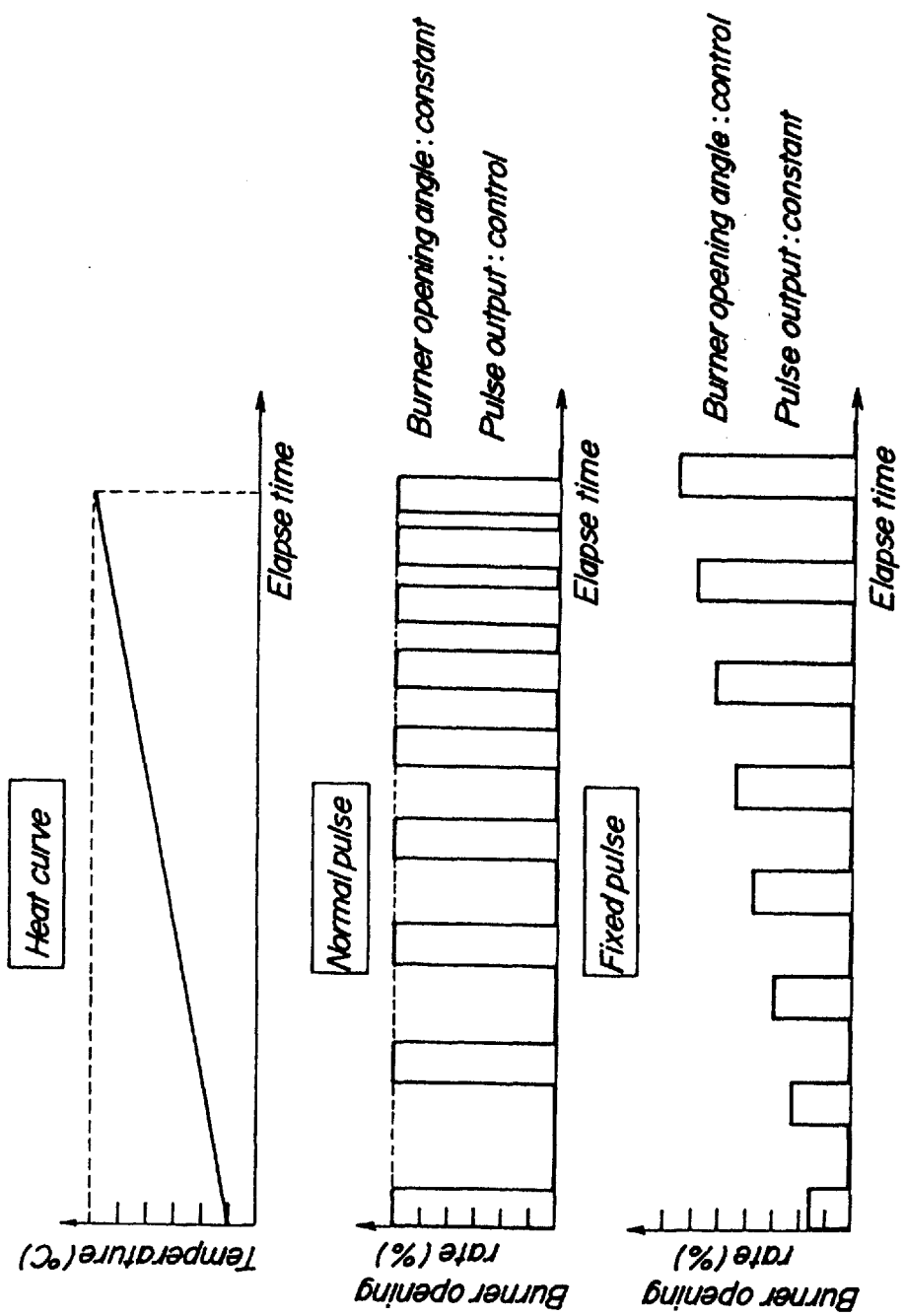
FIG. 2a is a graph illustrating one example of heat curve.
FIG. 2b is a graph depicting one embodiment in which the heat curve shown in FIG. 2a is performed by the pulse firing method.
FIG. 2c is a graph showing one embodiment in which the heat curve shown in FIG. 2a is performed by a fixed pulse firing method.

Then, a method of firing a ceramic formed body according to the invention (hereinafter, sometimes referred as a fixed pulse firing method) will be explained with reference to the known proportional firing method and the pulse firing method when they perform the same heat curve. FIG. 2a is a graph illustrating one example of heat curve, FIG. 2b is a graph depicting one embodiment in which the heat curve shown in FIG. 2a is performed by the pulse firing method, and FIG. 2c is a graph showing one embodiment in which the heat curve shown in FIG. 2a is performed by a fixed pulse firing method.

In the known pulse firing method shown in FIG. 2b, the burner is controlled in such a manner that a high output state and a low output state are repeated reciprocally at a predetermined constant burner opening angle, and a rest time (low output state) is increased or decreased in response to a relation between a target temperature and a heat ascending rate shown in the heat curve of FIG. 2a (i.e. pulse output is increased or decreased). In this case, in the case that an actual temperature is over the target temperature, the rest time is increased. In the rest time, a supply of the combustion gas for reducing a binder fume and an agitating effect for agitating a binder fume are stopped. On the other hand, in the fixed pulse firing method according to the invention, the burner is controlled in such a manner that a high output state and a low output state are repeated reciprocally at a predetermined constant pulse output i.e. predetermined constant on time and rest time, and the burner opening angle is increased or decreased in response to a relation between a target temperature and a heat ascending rate. In this case, even in the case that an actual temperature is over a target temperature, the burner opening angle is only decreased, while the pulse output is always constant. Therefore, it is possible to maintain both of a supply of the combustion air and an agitating effect in the firing furnace.

As clearly understood from the above comparison, in the fixed pulse firing method according to the invention, it is possible to maintain a concentration of binder fume low since a sufficient amount of combustion gas can be supplied in the firing furnace. Moreover, it is possible to make a distribution of binder fume uniform in the firing furnace since a sufficient agitation can be effected therein. In addition, it is possible to prevent an abrupt explosible combustion of binder fume generated when a concentration of binder fume is high in the firing furnace. As a result, it is possible to prevent a crack generation in a fired body. In this case, since effects of binder fume mentioned above are remarkable especially in a binder combustion temperature region in which a temperature is low and a temperature ascending rate is low, it is preferred to perform the fixed pulse firing method according to the invention at least in a temperature range from a binder combustion firing start temperature to a binder combustion firing end temperature i.e. from a heat ascending start temperature to about 600° C.

Moreover, the pulse firing method including the fixed pulse firing method can be effectively applied in a low temperature region for a firing of ceramic honeycomb structural formed body i.e. a temperature region in which a large amount of diffusion air is necessary since a low temperature ascending rate must be used, or a temperature region in which the after burner must be used since a binder fume is generated.

Figure 3:
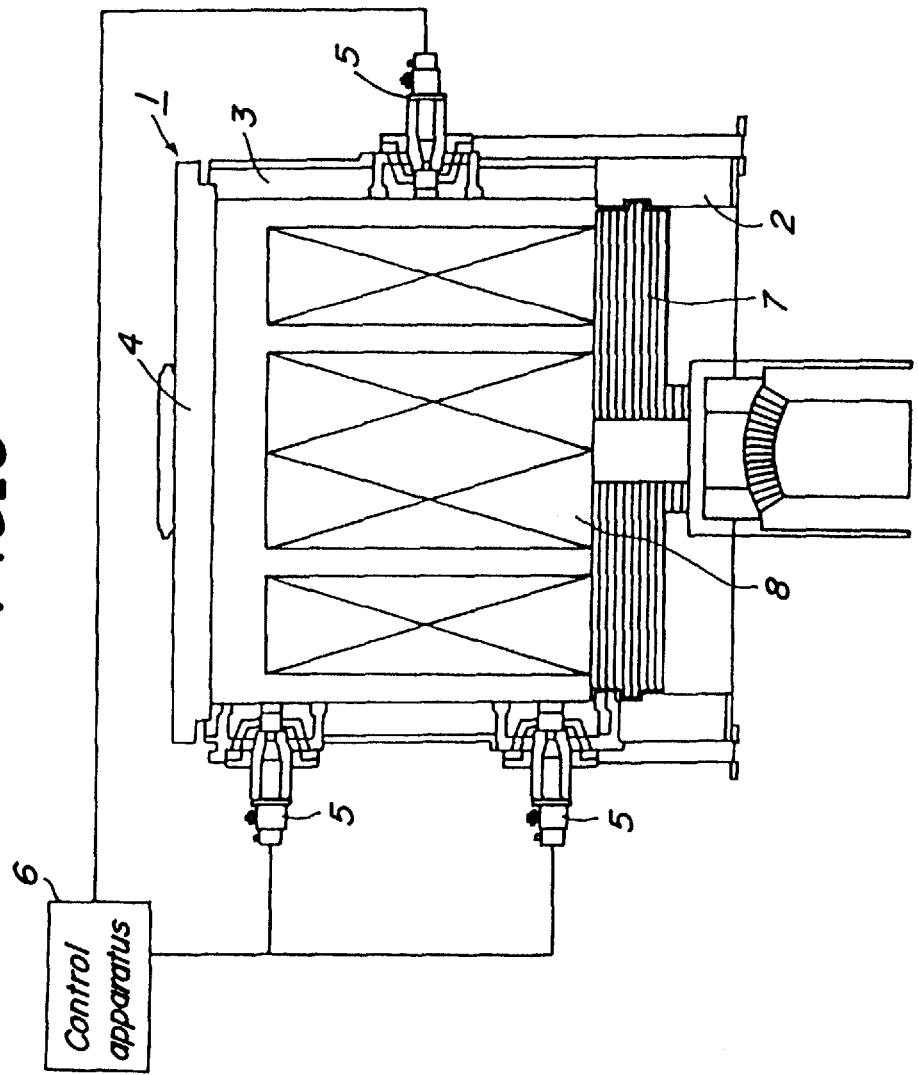
FIG. 3 is a schematic view illustrating one embodiment of an apparatus which performs a method of firing a ceramic formed body according to the invention.

FIG. 3 is a schematic view showing one embodiment of a known combustion apparatus which performs preferably a method of firing a ceramic formed body according to the invention. The combustion apparatus shown in FIG. 3 is one of a periodic kiln. In the embodiment shown in FIG. 3, a combustion apparatus 1 comprises a base member 2, side walls 3 arrange on the base member 2 and a ceiling member 4 arranged on the side walls 3 which construct a close space (with a door member not shown), one of a plurality burners 5 (in this embodiment three burners are used) arranged in the side walls 3, and a control apparatus 6 for controlling a firing condition of respective burners 5. Moreover, a firing is performed in such a manner that respective burners 5 is burned under a condition such that ceramic formed bodies 8 to be fired is arranged on a refractory slab 7.

Figure 4:
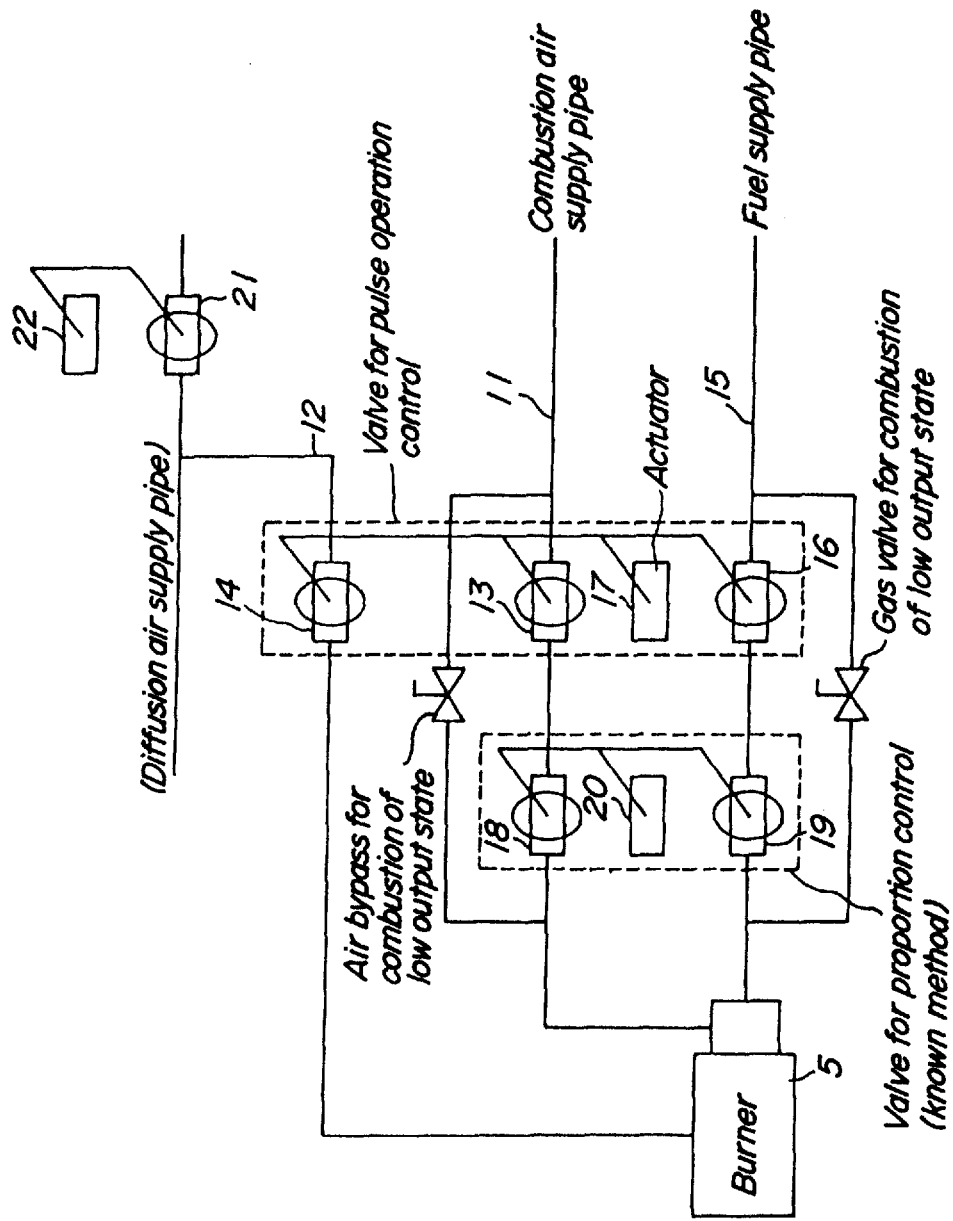
FIG. 4 is a schematic view for explaining a burner controlling method in the apparatus shown in FIG. 3.

FIG. 4 is a schematic view for explaining a method of firing a ceramic formed body according to the invention using the combustion apparatus shown in FIG. 3. In the embodiment shown in FIG. 4, an air for combustion is supplied to the burner 5 through a combustion air supply pipe 11 and a diffusion air supply pipe 12. Moreover, a reciprocal repeating of a firing output in the burner 5 between a high output state and a low output state is performed by synchronously closing or opening a valve 13 arranged in the combustion air supply pipe 11, a valve 14 arranged in the diffusion air supply pipe 12, and a valve 16 arranged in a fuel gas supply pipe 15 by means of a control motor 17. Further, a control of air/fuel ratio between an air for combustion and a fuel gas is performed by controlling a valve 21 arranged in the diffusion air supply pipe 12 by means of a control motor 22 under a condition such that a valve 18 arranged in the combustion air supply pipe 11 and a valve 19 arranged in the fuel gas supply pipe 15 are controlled by means of a control motor 20 in such a manner that a constant amount of air having air/fuel ratio of about 1 is supplied from the combustion air supply pipe 11. The reason of supplying an air for combustion through two pipes i.e. the combustion air supply pipe 11 and the fuel gas supply pipe 12 is to prevent an accidental fire.

Hereinafter, an actual embodiment will be explained.

EXAMPLE

Ceramic structural bodies including cordierite as a main ingredient and forming agents consisting mainly of methylcellulose were extruded by using a metal mold to prepare honeycomb formed bodies. The thus prepared honeycomb formed bodies were fired to obtain fired bodies of sample Nos. 1–5 according to the invention and sample Nos. 11–13 according to the known method. In the firing of the sample Nos. 1–5 according to the invention, a firing from a room temperature to 400° C. was performed by the fixed pulse firing method according to the invention as shown in the following Table 1, and a firing after 400° C. was performed by the proportional firing method. On the other hand, in the firing of the sample Nos. 11–13 according to the known method, a firing from a room temperature to 400° C. was performed by the known normal pulse firing method as shown in the following Table 1, and a firing after 400° C. was performed by the proportional firing method. In the fixed pulse firing method mentioned above, the pulse output was always maintained at constant as shown in the following Table 1 while a heat amount to be supplied during a high combustion state i.e. high output state was varied. On the other hand, in the known normal pulse firing method, a heat amount to be supplied during the high combustion state was always maintained at constant as shown in the following Table 1 while the pulse output was varied. Moreover, in the respective firings mentioned above, a heat amount to be supplied during a low combustion state i.e. low output state was 5000 kcal/hr per respective burners.

Then, a gas amount supplied from respective burners was calculated as a gas amount per organic substances (forming agents) of 1 kg in the honeycomb formed body so as to compare a diffusion gas amount to be supplied in respective samples. Moreover, a crack generation percent after firing was also measured. For a further comparison, a temperature distribution in the firing furnace, a reduction percent of fuel consuming amount and a reduction percent of power consuming amount were also measured. The temperature distribution in the firing furnace was obtained by measuring a temperature at a plurality of positions in the firing furnace and calculating a temperature difference between max temperature and min temperature. The reduction percent of fuel consuming amount was measured as a reduction percent with respect to a fuel consuming amount of the proportional firing method. In this case, the fuel consuming amount of respective samples was measured as a sum of a fuel amount consumed in the main burner provided in the combustion apparatus and a fuel amount consumed in the after burner provided in the gas duct for keeping a temperature of exhaust gas constant. The reduction percent of power consuming amount was measured as a reduction percent with respect to a power consuming amount of the proportional firing method. The results were shown in Table 1.

TABLE 1

|  |  | Examples of present invention | | | | | Examples of known method | | |
| --- | --- | --- | --- | --- | --- | --- | --- | --- | --- |
|  |  | 1 | 2 | 3 | 4 | 5 | 11 | 12 | 13 |
| Firing method |  | fixed pulse | | | | | normal pulse | | |
| Pulse output (%) | upper portion | 7 | 10 | 10 | 30 | 30 | — | — | — |
|  | intermediate portion | 7 | 10 | 10 | 30 | 30 | — | — | — |
|  | lower portion | 7 | 10 | 10 | 30 | 30 | — | — | — |
| Heat amount to be supplied during high combustion state (kcal/hr/burner) | upper portion | — | — | — | — | — | 70000 | 150000 | 200000 |
|  | intermediate portion | — | — | — | — | — | 70000 | 150000 | 200000 |
|  | lower portion | — | — | — | — | — | 70000 | 150000 | 200000 |
| Time of high combustion state (sec.) |  | 3 | 1 | 3 | 1 | 3 | 3 | 3 | 3 |
| Heat amount to be supplied during high combustion state (kcal/hr/burner) |  | 5000 | 5000 | 5000 | 5000 | 5000 | 5000 | 5000 | 5000 |
| Gas amount supplied from burner per organic substances of 1 kg in honeycomb before firing (Nm$^3$/hr) |  | 5 | 6 | 7 | 9 | 9 | 5 | 4 | 3 |
| Crack generation percent after firing (%) |  | 20 | 0 | 0 | 0 | 0 | 17 | 32 | 39 |
| Temperature distribution in firing furnace (max.–min.) (°C.) |  | 18 | 14 | 12 | 9 | 7 | 25 | 28 | 33 |
| Reduction percent of fuel consuming amount (main burner + after burner) |  | 55 | 50 | 49 | 46 | 43 | 57 | 67 | 73 |
| Reduction percent of power consuming amount |  | 60 | 52 | 51 | 50 | 47 | 64 | 65 | 67 |

From the results shown in Table 1, it is understood that, in the examples of the present invention, the crack generation percent is low and the temperature distribution in the firing furnace is excellent as compared with the known examples. Moreover, it is understood that both of the reduction percent of fuel consuming amount and the reduction percent of power consuming amount according to the examples of the present invention are little low as compared with the known examples but they are sufficient as compared with the proportional firing method. Further, it is understood that, among the examples of the present invention, it is preferred to make the pulse output over 10% and to make a gas amount supplied from the burner per organic substances of 1 kg in the honeycomb formed body before firing over 6 Nm$^3$/hr so as to reduce a crack generation after firing. Furthermore, in order to improve a temperature distribution, it is understood that it is preferred to make a time of the high combustion state over 3 seconds.

In the embodiment shown in FIG. 4, the combustion air supply pipe and the diffusion air supply pipe are arranged respectively. However, it is possible to achieve the fixed pulse firing method according to the invention by supplying a large amount of excessive air only through the combustion air supply pipe without using the diffusion air supply pipe.

As clearly understood from the above explanations, according to the invention, the known pulse firing method is improved in that an opening angle of the burner is controlled under a condition such that the pulse output is maintained at constant. Therefore, it is possible to increase a gas amount to be supplied with respect to the known pulse firing method, and thus a concentration of binder fume can be controlled in such a manner that it is not beyond a lower limit of explosion at which a binder fume is abruptly combusted. In addition, in the present invention, no binder fume remains in the firing furnace in a highly condensed concentration since an atmosphere in the firing furnace is agitated at a high speed and at a high frequency. Therefore, it is possible to prevent a crack generation in the fired bodies.

What is claimed is:

1. A method of firing a ceramic formed body containing a binder, in which said ceramic formed body is fired by controlling a firing output in such a manner that a high output state and a low output state are repeated reciprocally, comprising: a step of controlling an opening angle of a burner defining said high output state, while a pulse output defining a reciprocal interval between said high output state and said low output state is maintained at a constant rate.

2. The method according to claim 1, wherein said step of controlling an opening angle of a burner is performed at a temperature in which the binder included in said ceramic formed body is fired.

3. The method according to claim 2, wherein a gas amount supplied from said burner per organic substances of 1 Kg in said ceramic formed body is controlled over 6 Nm3/hr during firing.

4. The method according to claim 2, wherein said temperature at which a binder included in said ceramic formed body is fired is from a temperature ascending start temperature to about 600° C.

5. The method according to claim 1, wherein said ceramic formed body is a ceramic honeycomb structural body.

* * * * *

UNITED STATES PATENT AND TRADEMARK OFFICE
CERTIFICATE OF CORRECTION

PATENT NO. : 5,868,977
DATED : February 9, 1999
INVENTOR(S) : Yasuhiro ITO et al.

It is certified that error appears in the above-indentified patent and that said Letters Patent is hereby corrected as shown below:

On the title page, Item [54], column 1, [54]: change "METHOD OF FIRING CERAMIC FOMRED BODY" to --METHOD OF FIRING CERAMIC FORMED BODY--.

Signed and Sealed this

Twenty-fifth Day of May, 1999

Attest:

Q. TODD DICKINSON

*Attesting Officer*     *Acting Commissioner of Patents and Trademarks*